United States Patent [19]

Hart

[11] Patent Number: 4,944,522
[45] Date of Patent: Jul. 31, 1990

[54] PIN RETRACTOR FOR SEMI-TRAILER TANDEMS

[76] Inventor: Bobbie M. Hart, P.O. Box 7514, Roanoke, Va. 24019

[21] Appl. No.: 248,955

[22] Filed: Sep. 26, 1988

[51] Int. Cl.$^5$ .......................... B60G 5/04; B62D 53/06
[52] U.S. Cl. .................... 280/149.2; 280/80.1
[58] Field of Search .......................... 280/80.1, 149.2

[56] References Cited

U.S. PATENT DOCUMENTS

| | | | |
|---|---|---|---|
| 3,618,969 | 11/1971 | Glassmeyer | 280/80 B |
| 3,778,079 | 12/1973 | Vornberger et al. | 280/149.2 |
| 4,273,347 | 6/1981 | Hulse | 280/80 B |
| 4,286,797 | 9/1981 | Mekosh, Jr. et al. | 280/80 B |
| 4,353,565 | 11/1982 | Smith et al. | 280/80 B |
| 4,641,846 | 2/1987 | Ehrhart | 280/149.2 |
| 4,838,578 | 6/1989 | Baxter | 280/149.2 |

OTHER PUBLICATIONS

"The Revenue Producer" brochure, 2 pages, date unknown.
"The Lite-Slide" brochure, 4 pages, date unknown.
"Qwik-Release" brochure, 2 pages, date unknown.
"Lite-Slide" brochure, 2 pages, date unknown.
"Maintenance Tip: Sliders are Slick Savers," p. 8, *NATSO Truckers News*, Jul., 1988.

*Primary Examiner*—Richard A. Bertsch
*Attorney, Agent, or Firm*—Bacon & Thomas

[57] ABSTRACT

A pneumatically powered pin retractor is disclosed. Semi-trailers comprise tandems which can be slid forward and backward when a set of pins are retracted. In conventional semi-trailers, manually pulling a pin release lever located on the side of the tandem rotates the pin control shaft, thereby retracting the pins. The disclosed pin retractor comprises a lever arm attached to the pin control shaft, a pneumatic ram to push the lever arm thereby rotating the pin control shaft and retracting the pins, and a means for activating the pneumatic ram. The source of air pressure to power the pneumatic ram is normally the service air tank on the tandem.

20 Claims, 2 Drawing Sheets

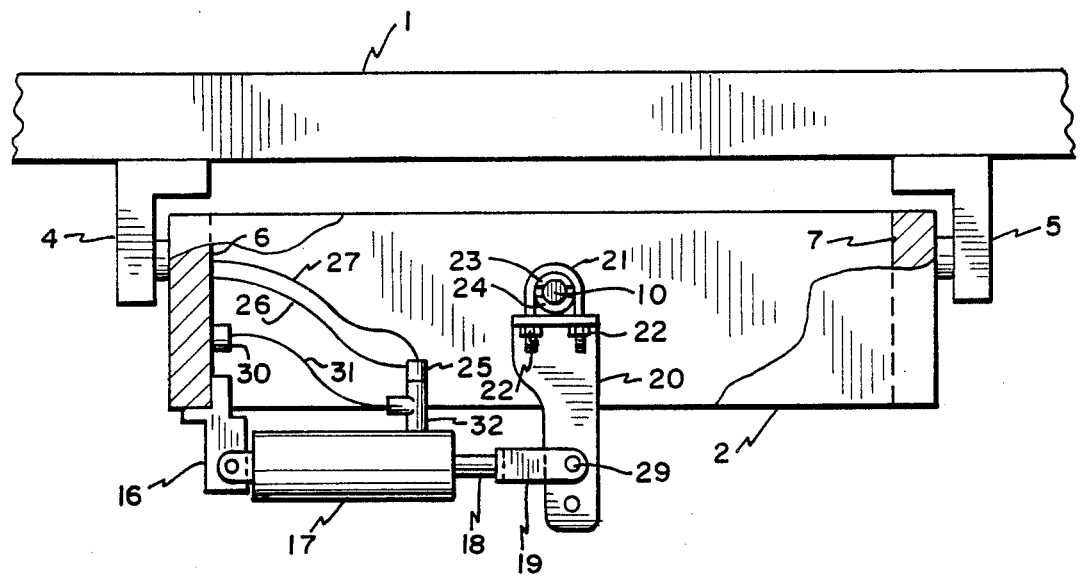
FIG_3
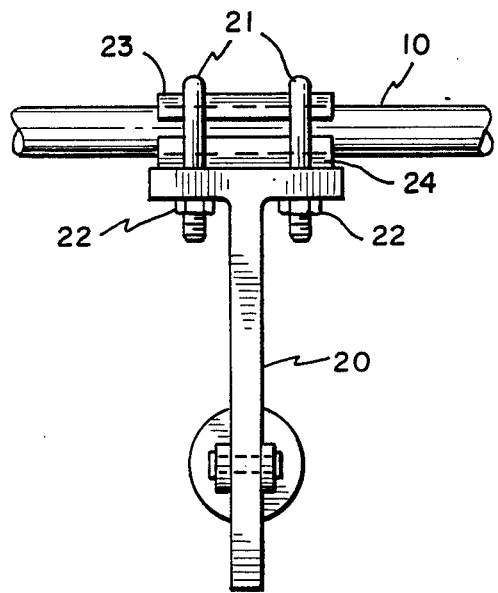
FIG_4

PIN RETRACTOR FOR SEMI-TRAILER TANDEMS

BACKGROUND OF THE INVENTION

This invention relates to a pin retractor for semi-trailer tandems, and a method of retracting the pins on a semi-trailer tandem. Trucks are used to transport a great variety of products. Many trucks comprise a tractor attached to one or more semi-trailers. A typical tractor is provided with a front set of wheels to steer the tractor, and one or more rear axles. The engine of the tractor typically drives the rear axles. The semi-trailer immediately behind the tractor is typically attached to the tractor by means of a fifth wheel, which is positioned on the tractor above the rear axle or axles. Semi-trailers are provided with a tandem, which may comprise one or more axles. In most semi-trailers, the tandem can be slid backward and forward to adjust the load on the rear axle or axles.

A typical semi-trailer is provided with two rails at the rear and on the bottom of the cargo surface. The sliders of the tandem are adapted to be received between the rails, such that the tandem cannot slide from side to side. However, the tandem is adapted to slide backward and forward along the rails.

When a semi-trailer is being moved down a roadway by a tractor, the tandem must be secured in a fixed position. This is typically achieved by a plurality of pins. Each pin is attached to the tandem such that the pin can move sideways, but not backward or forward. The rails on the semi-trailer contain a plurality of apertures, adapted to receive the pins. A typical tandem is provided with two sets of pins, one at the front and one at the rear. In each set of pins, one is on the left side of the semi-trailer and one is on the right side of the semi-trailer. When the pins are in the extended position, each pin fills an aperture in one of the rails, and thereby prevents forward or rearward movement of the tandem relative to the rails. When the pins are in the retracted position, they do not engage any of the apertures in the rails, and the tandem can be slid backward or forward on the rails. The range of movement of the tandem is usually restricted by a front stop and a rear stop, which prevent the tandem from sliding so far that it becomes disengaged from the rails.

The ability to move the tandem relative to the cargo surface of the semi-trailer is desirable for a number of reasons. When a tractor and semi-trailer must maneuver around city streets, relatively tight corners are frequently encountered. By moving the tandem forward, it is easier to negotiate tight corners. When a tractor and semi-trailer are traveling on highways, moving the tandem toward the rear puts a larger percentage on the load on the axles of the tractor, thereby providing a better ride.

Semi-trailers in current use typically have only a manual means for adjusting the position of the tandem relative to the cargo surface. In order to slide the tandem of such a semi-trailer, a number of steps are necessary: (1) the driver applies the brakes of both the tractor and the semi-trailer; (2) the driver climbs out of the tractor and pulls the pin release lever which is normally immediately in front of the left wheel or wheels on the front axle of the tandem; (3) the driver returns to the cab and releases the brakes on the tractor; (4) the tractor is then driven either forward or backward thereby moving the cargo surface of the semi-trailer on the tandem (the tandem remains stationary because the brakes on the tandem have not been released); (5) once the desired position of the tandem is achieved, the driver applies the brakes of the tractor; (6) the driver leaves the cab of the tractor and pushes the pin release lever in, so as to engage the pins of the tandem into the apertures on the rails, thereby locking the position of the tandem relative to the cargo surface of the semi-trailer; (7) the driver then returns to the cab of the tractor, releases the brakes on the tractor and the semi-trailer, and drives away.

In practice, a number of problems are common in this procedure. For example, the pins frequently become stuck in a specific position. The driver can try to remedy this condition by applying the brakes of the tandem, and then driving the tractor backward and forward slightly, so as to rock the tandem. This back and forth motion can damage the clutch, drive line and rear end of the tractor. In extreme cases, a second person may be necessary to pull on the pin release lever while the driver is using the tractor to rock the tandem back and forth. The person who is pulling on the pin release lever during such a maneuver is in a relatively dangerous position.

Another problem frequently encountered in positioning a tandem relative to the cargo surface of a semi-trailer, is the difficulty in positioning the tandem such that the pins are in alignment with apertures on the rails. This sometimes leads to a repetition of steps (3), (4) and (5) described above, until the pins are in a position to be received by the correct apertures when the pin release lever is pushed.

The advantage of a pin retracting mechanism for a semi-trailer which is pneumatically, as opposed to manually, powered is recognized in the prior art. For example, U.S. Pat. No. 4,286,797 dated Sept. 1, 1981 to Mekosh et al., (the disclosure of which is hereby incorporated by reference) discloses a pin retracting mechanism for a trailer. However, the mechanism disclosed by this patent cannot be economically used in most of the tandems of semi-trailers in current use, because extensive structural modifications of the tandem would be required.

SUMMARY OF THE INVENTION

The present invention overcomes the problems inherent in the prior art structures and methods, by providing a pin retractor which comprises a lever arm that may be attached to the pin control shaft of a tandem at any point along its length, a pneumatic ram that is attached at one end to the lever arm and at the other end to the structure of the tandem, and means for activating the pneumatic ram. The ram activating means comprises a valve to control the flow of air to the ram, and an air line to connect the valve to a source of air pressure, such as the air tank found on the tandems of most semi-trailers. When the valve is in the open position, the air pressure moves the piston of the ram, which rotates the pin control shaft thereby retracting the pins. When the pins are retracted, the tandem can be slid backward and forward relative to the cargo surface of the semi-trailer.

In the preferred embodiment, an electric valve is opened by closing an electrical circuit. The electrical circuit preferably includes a spring-loaded switch in the cab of the tractor. The driver closes the circuit by pushing the switch in the cab of the tractor, thereby opening the valve, moving the ram and retracting the pins. When the electrical circuit is opened, the valve is closed, and the ram returns to its original position through the action of a mechanical spring.

The preferred embodiment also includes a spring-loaded, manual air switch, which is mounted on the tandem at a position adjacent to the pin release lever. One air line connects the manual air switch to a source of air pressure, such as the air tank found on the tandems of most semi-trailers, and another air line connects the manual air switch to the ram. When the manual air switch is pushed, the air pressure moves the piston of the ram, which rotates the pin control shaft thereby retracting the pins. When the manual air switch is released, the ram returns to its original position through the action of a mechanical spring.

BRIEF DESCRIPTION OF THE DRAWINGS

FIG. 3 is an end view of the interior of a tandem of a semi-trailer.

FIG. 4 is a side view of the lever arm attached to the pin control shaft.

DETAILED DESCRIPTION OF THE INVENTION

Figure 1:
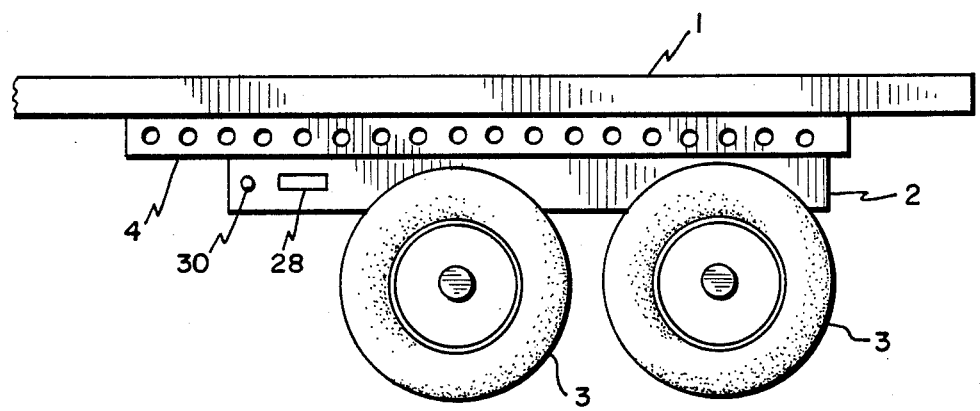
FIG. 1 is a side view of the rear end of a semi-trailer.

FIG. 1 shows the end of a semi-trailer with left rail 4 attached to the underside of the rear of cargo surface 1. Left rail 4 is provided with a plurality of circular apertures adapted to receive one or more pins from tandem 2. Tandem 2 is provided with a plurality of wheels 3, and a pin release lever 28 in front of wheels 3. When the pin release lever 28 is pulled, the pins of tandem 2 are retracted, thereby allowing tandem 2 to slide backwards or forwards beneath cargo surface 1. Tandem 2 is also provided with spring-loaded, manual air switch 30, which is mounted in front of pin release lever 28. The function of manual air switch 30 is described below with reference to FIG. 3.

Figure 2:
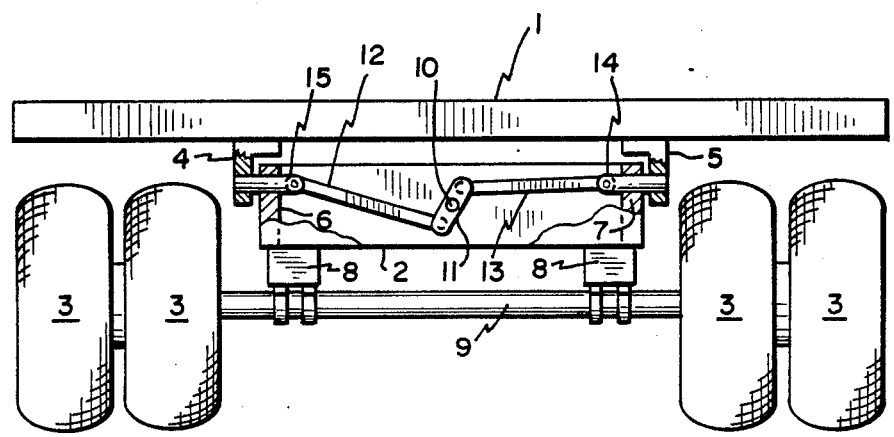
FIG. 2 is an end view of a semi-trailer.

FIG. 2 shows the rear of a semi-trailer. Left rail 4 and right rail 5 are mounted on the underside of cargo surface 1. Left rail 4 rests on the left slider 6 of tandem 2. Right rail 5 rests on the right slider 7 of tandem 2. A plurality of wheels 3 are mounted on axle 9, which is attached to tandem 2 through suspension means 8. Right pin 14 extends through right slider 7 into an aperture in right rail 5. Left pin 15 extends through left slider 6 and into an aperture in left rail 4. Left pin 15 is pivotally connected to left connecting rod 12. Left connecting rod 12 is pivotally connected to shaft extension 11. Right pin 14 is pivotally connected to right connecting rod 13. Right connecting rod 13 is pivotally connected to shaft extension 11. Shaft extension 11 is attached to pin control shaft 10. When pin control shaft 10 is rotated in a counterclockwise direction, connecting rods 12 and 13 pull pins 15 and 14 inward, thereby disengaging pins 14 and 15 from apertures in rails 5 and 4. Once the pins 14 and 15 have been disengaged from apertures in rails 5 and 4, the tandem 2 may be slide backward or forward on sliders 6 and 7 relative to cargo surface area 1.

FIG. 3 shows an end view of the interior of tandem 2, which has been modified according to the present invention. Mounting bracket 16 is welded to left slider 6. Ram 17 is pivotally connected to mounting bracket 16. Ram 17 is provided with piston 18. Piston 18 is attached to connecting bracket 19. Connecting bracket 19 is pivotally connected to connecting pin 29, which passes through an aperture in lever arm 20. Connecting pin 29 can be manually disengaged from lever arm 20. In the unlikely event of a failure of the mechanism of the present invention, this allows use of the pin release lever 28 in a manual mode, just as if the mechanism of the present invention had never been installed on the tandem. In the preferred embodiment of the invention, connecting pin 29 is secured to connecting bracket 19 and lever arm 20 by means of a carter key. The side of lever arm 20 which faces ram 17 is curved so that connecting bracket 19 does not contact lever arm 20 when piston 18 is fully extended. Lever arm 20 is connected to pin control shaft 10 by means of U bolt 21, nuts 22, upper pipe segment 23 and lower pipe segment 24. Electric valve 25 is mounted on T-fitting 32, which is mounted on ram 17. Air line 26 provides a source of air pressure to valve 25, and electric line 27 selectively provides electric power to open valve 25. Spring-loaded manual air switch 30 is mounted on left slider 6. An air line (not shown) connects a source of air pressure to manual air switch 30. Second air line 31 connects manual air switch 30 to T-fitting 32.

FIG. 4 shows lever arm 20, which has a T-shaped cross section and is provided with four apertures to receive the ends of U bolts 21. Upper pipe segment 23 is spot welded to U bolts 21. Lower pipe segment 24 is spot welded to the upper surface of lever arm 20. When the present invention is being installed on the tandem, U bolts 21 and upper pipe segment 23 form a single piece which is put on top of pin control shaft 10. Lever arm 20 is then positioned such that the ends of U bolts 21 extend through the apertures in lever arm 20, and nuts 22 are engaged to the U bolts 21, but not tightened. Lever arm 20 can then be slid backwards or forwards along pin control shaft 10, so as to align the apertures in the lower end of lever arm 20 with connecting bracket 19. Once lever arm 20 is in the appropriate position, nuts 22 are tightened. Upper pipe segment 23 and lower pipe segment 24 provide sufficient surface area in common with pin control shaft 10, so as to grip the exterior of pin control shaft 10 without slipping after nuts 22 are tightened.

The fact that lever arm 20 can be connected to pin control shaft 10 at any point along its length is advantageous. It avoids any need to structurally modify pin control shaft 10 or shaft extension 11. In addition, there is no need to modify the connection (not illustrated) between pin release lever 28 and pin control shaft 10. This further allows mounting bracket 16 to be welded to left slider 6 at a variety of positions.

In the preferred embodiment of the present invention, a spring-loaded electric switch is mounted in the cab of the tractor with a safety cover to prevent the inadvertent activation of the switch. When the switch is pressed, an electric circuit is closed. The electric circuit activates a warning light and warning buzzer in the cab of the tractor, to alert the driver that the pins of the tandem are retracted. Pressing the spring-loaded switch also closes the electric circuit through electric line 27 to valve 25. Most semi-trailers in use at the present time include an electrical connection between the tractor and the semi-trailer with a seven wire harness. The harness connectors between the tractor and the semi-trailer are typically circular, with one electrical line in the middle, and the remaining six electrical lines in a circle around the central electrical line. The central electrical line is typically not used. For this reason, the preferred embodiment of the present invention utilizes the center electrical line of this seven pin harness connector to connect the electric switch in the cab of the tractor with the electric valve 25 of the present invention. Optionally, another spring-loaded electric switch may be provided immediately adjacent to pin release lever 28.

Most semi-trailers in current use have pneumatic brakes. The tandem is typically provided with two air tanks, a service air tank and an emergency air tank. The plug in the service air tank can be removed, and a T-fitting attached so as to connect the service air tank to both air line 26 and the air line (not shown in the drawings) which provides a source of air pressure to manual air switch 30. When the spring-loaded electric switch in the cab of the tractor is pushed and the electric circuit is closed, electric valve 25 opens and air pressure from the service air tank flows into ram 17 thereby extending piston 18. When the spring-loaded manual air switch 30 on left slider 6 is pushed, air pressure from the service air tank flows into ram 17 thereby extending piston 18.

The degree of rotation of pin control shaft 10 is controlled by selecting one of the plurality of apertures at the bottom of lever arm 20 to be engaged by connecting pin 29. The extension of piston 18 is a fixed distance. A greater degree of rotation of pin control shaft 10 is achieved when the aperture at the bottom of lever arm 20 is used, as compared to using the other aperture. FIG. 3 illustrates lever arm 20 with two apertures at the bottom, but a plurality of apertures could readily be provided.

In the preferred embodiment of the present invention, ram 17 has an inside diameter of about two inches. A two hundred pound spring of about 1 and ⅜ inch in diameter is contained within the ram, to return the piston to its original position. As the spring returns the piston 18 to its original position, the air in the ram may be vented through a relief valve. If valve 25 is a three way valve, then the air in ram 17 may also be vented through valve 25. If manual air switch 30 comprises a three way valve, then the air in ram 17 may also be vented through manual air switch 30.

If valve 25 is a three way valve, then the open position allows air from air line 26 to pass into the interior of ram 17, and prevents air from the interior of ram 17 from reaching the surrounding atmosphere; and the closed position seals air line 26 from both the atmosphere and the interior of ram 17, and allows air from the interior of ram 17 to be vented to the surrounding atmosphere.

If manual air switch 30 comprises a three way valve, then pressing manual air switch 30 places the valve in the open position and allows air from the source of air pressure to pass through second air line 31 into the interior of ram 17; and releasing manual air switch 30 places the valve in the closed position which both seals off the source of air pressure, and allows second air line 31 to vent air from the interior of ram 17 to the surrounding atmosphere.

In the preferred embodiment of the present invention, the upper surface of lever arm 20 contains a curved indentation adapted to receive lower pipe segment 24. The outer radius of lower pipe segment 24 is the same as the curvature in the upper surface of lever arm 20.

In the preferred embodiment of the invention, ram 17 has an 8 inch stroke, lever arm 20 is about 8 inches long, and lever arm 20 is provided with two one-half inch holes at the lower end, centered about three-quarters inch and two inches, respectively, from the bottom of lever arm 20. Modifications in the length of the stroke, the length of the lever arm, and the positioning of the holes in the lever arm are all within the skill of one of ordinary skill in the art, so as to achieve the desired rotation of pin control shaft 10.

FIG. 3 illustrates ram 17 which is in the contracted position when the pins are extended. A less preferred embodiment of the invention uses a ram which is in the extended position when the pins are extended. This less preferred embodiment has the disadvantage of exposing the length of piston 18 to the surrounding environment, including dirt and corrosive salt (in winter driving conditions).

The present invention is suitable for most tandems in use today, regardless of the number of axles in the tandem, and regardless of the number of pins in the tandem. When a single tractor is pulling multiple semi-trailers, then a means for selectively activating the ram on each tandem is desirable. Various structural methods of achieving this means are within the skill of one of ordinary skill in the art.

I claim:

1. In a tandem which comprises a pin control shaft, wherein the rotation of said pin control shaft retracts pins on the tandem, the improvement comprising:
   a lever arm attached to said pin control shaft by means of gripping the exterior of said pin control shaft at a point where there is no shaft extension, wherein said gripping means comprise two U bolts, an upper pipe segment and a lower pipe segment; and
   a pneumatic ram pivotally attached both to the end of said lever arm and to said tandem; and
   means for activating said ram.

2. The improvement of claim 1, wherein said ram activating means comprises an electric valve allowing selective communication between the interior of said ram and a source of air pressure.

3. The improvement of claim 2, wherein said tandem is attached to the cargo surface of a semi-trailer, said semi-trailer is attached to a tractor, and said electric valve is activated by an electric switch in the cab of the tractor.

4. The improvement of claim 1, wherein said ram activating means comprises a manual valve allowing selective communication between the interior of said ram and a source of air pressure.

5. The improvement of claim 4, wherein a manual air switch comprises said manual air valve, and said manual air switch is located on said tandem.

6. The improvement of claim 5, wherein said manual air switch is spring-loaded, and further comprising a warning device on said tandem which is activated whenever said manual air switch is activated.

7. The improvement of claim 6, wherein said ram activating means causes the extension of the ram.

8. The improvement of claim 6, wherein said ram activating means causes the contraction of the ram.

9. The improvement of claim 5, wherein said ram activating means further comprises an electric valve allowing selective communication between the interior of said ram and said source of air pressure.

10. The improvement of claim 9, wherein said tandem is attached to the cargo surface of a semi-trailer, said semi-trailer is attached to a tractor, and said electric valve is activated by an electric switch in the cab of the tractor.

11. The improvement of claim 10, wherein said electric switch is spring loaded, and further comprising a warning device in said cab which is activated whenever said electric valve is activated.

12. In a tandem which comprises a pin control shaft, wherein the rotation of said pin control shaft retracts pins on the tandem, the improvement comprising:
- a lever arm attached to said pin control shaft by means of gripping the exterior of said pin control shaft at a point where there is no shaft extension, wherein said gripping means comprise two U bolts, an upper pipe segment and a lower pipe segment; and
- a pneumatic ram pivotally attached both to the end of said lever arm and to said tandem; and
- means for activating said ram;
- wherein said ram activating means comprises an electric valve allowing selective communication between the interior of said ram and a source of air pressure;
- wherein said tandem is attached to the cargo surface of a semi-trailer, said semi-trailer is attached to a tractor, and said electric valve is activated by an electric switch in the cab of the tractor;
- wherein said electric switch is spring-loaded, and further comprising a warning device in said cab which is activated whenever said electric valve is activated.

13. The improvement of claim 12, wherein said ram activating means causes the extension of the ram.

14. The improvement of claim 12, wherein said ram activating means causes the contraction of the ram.

15. A retrofit kit for a tandem comprising:
- a lever arm, wherein the top of said lever arm is adapted to grip the exterior of a pin control shaft; and
- a pneumatic ram, wherein one end of said ram is adapted to be pivotally attached to said lever arm, and the other end of said ram is adapted to be pivotally attached to said tandem; and
- a means for selectively activating said ram.

16. The retrofit kit of claim 15, wherein said lever arm about 8 inches in length, said pneumatic ram has a stroke of about 8 inches, and said means for selectively activating said ram comprises a valve.

17. In a tandem which comprises a pin control shaft, wherein the rotation of said pin control shaft retracts pins on the tandem, the improvement comprising:
- a lever arm attached to said pin control shaft at a point where there is no shaft extension; and
- a pneumatic ram pivotally attached both to the end of said lever arm and to said tandem; and
- means for activating said ram.

18. The improvement of claim 17, wherein said lever arm is attached to said pin control shaft by means of gripping the exterior of said pin control shaft.

19. In a tandem which comprises a pin control shaft, wherein the rotation of said pin control shaft retracts pins on the tandem, the improvement comprising:
- a lever arm attached to said pin control shaft at a point where there is no shaft extension; and
- a pneumatic ram pivotally attached both to the end of said lever arm and to said tandem, and said tandem is attached to the cargo surface of a semi-trailer, and said semi-trailer is attached to a tractor; and
- electrical means for activating said ram, wherein said activating means are controlled by an electric switch in the tractor; and
- means for connecting said electrical switch to said activating means, wherein said connecting means utilizes the center electrical line of a seven wire harness that connects the tractor and the semi-trailer.

20. The improvement of claim 17, wherein said tandem is attached to a semi-trailer, said semi-trailer is attached to a tractor, and said activating means may be controlled from the cab of said tractor.

* * * * *